May 5, 1970   D. H. ROBBINS ET AL   3,509,651

OPTICAL VIEWER

Filed Jan. 3, 1966   2 Sheets-Sheet 1

INVENTORS.
DANIEL H. ROBBINS
HENRY N. FAIRBANKS
ROBERT H. POWERS
EDMUND J. PIERCE

BY Robert L. Nathans

ATTORNEY

United States Patent Office 3,509,651
Patented May 5, 1970

3,509,651
OPTICAL VIEWER
Daniel H. Robbins, Henry N. Fairbanks, Robert H. Powers, and Edmund J. Pierce, Rochester, N.Y., assignors to Itek Corporation, Lexington, Mass., a corporation of Delaware
Filed Jan. 3, 1966, Ser. No. 526,934
Int. Cl. G09f 11/32
U.S. Cl. 40—78                    5 Claims

ABSTRACT OF THE DISCLOSURE

Apparatus is disclosed herein which supports and selectively positions a chip transparency with respect to a film gate to selectively display various positions of the indicia carrier by the transparency. The system is designed so that the viewer need not make large changes in the position of the transparency or support mechanism as various chips are viewed.

---

The present invention relates to optical viewers and more particularly to optical viewers for viewing chip transparencies.

Certain optical projectors are utilized to view sizable transparencies known as chips which contain blocks of data often arranged in rolls and columns. In prior art viewers the chips are inserted between a pair of spring biased optical flats and the operator slides the chip in horizontal and vertical directions until the desired block of data is centered about the optical axis of the projector to be viewed. Since this procedure results in abrasion of the chip, it has been suggested that the optical flats be made movable and selectively position the flats themselves. However, this approach would result in the employment of large, heavy optical flats and heavy and space consuming drive mechanisms for position the flats where automatic positioning is required.

It is also desirable to provide a chip viewer which additionally accommodates film wound on reels positioned astride the film gate, together with means for automatically opening the flats upon actuation of the reels to prevent film abrasion and mechanical loading of the reels. However, if the flats are heavy and movable, the provision of a mechanism for automatically opening the flats becomes difficult, expensive and space consuming. It is much more desirable to utilize small fixed optical flats which may be separated by a relatively small solenoid.

Accordingly, it is the principal object of the present invention to provide a new and improved optical viewer.

It is a further object of the present invention to provide a new and improved optical viewer for viewing either sizable chip transparencies or film wound upon reels.

It is a further object of the present invention to provide a new and improved optical viewer which may readily selectively position sizable chip transparencies without utilizing large, heavy optical flats and spacious and heavy mechanisms for separating the flats and positioning them relative to the optical axis of the viewer.

Other objects and advantages will become apparent as the following description taken in conjunction with the drawings proceeds.

Figure 1:
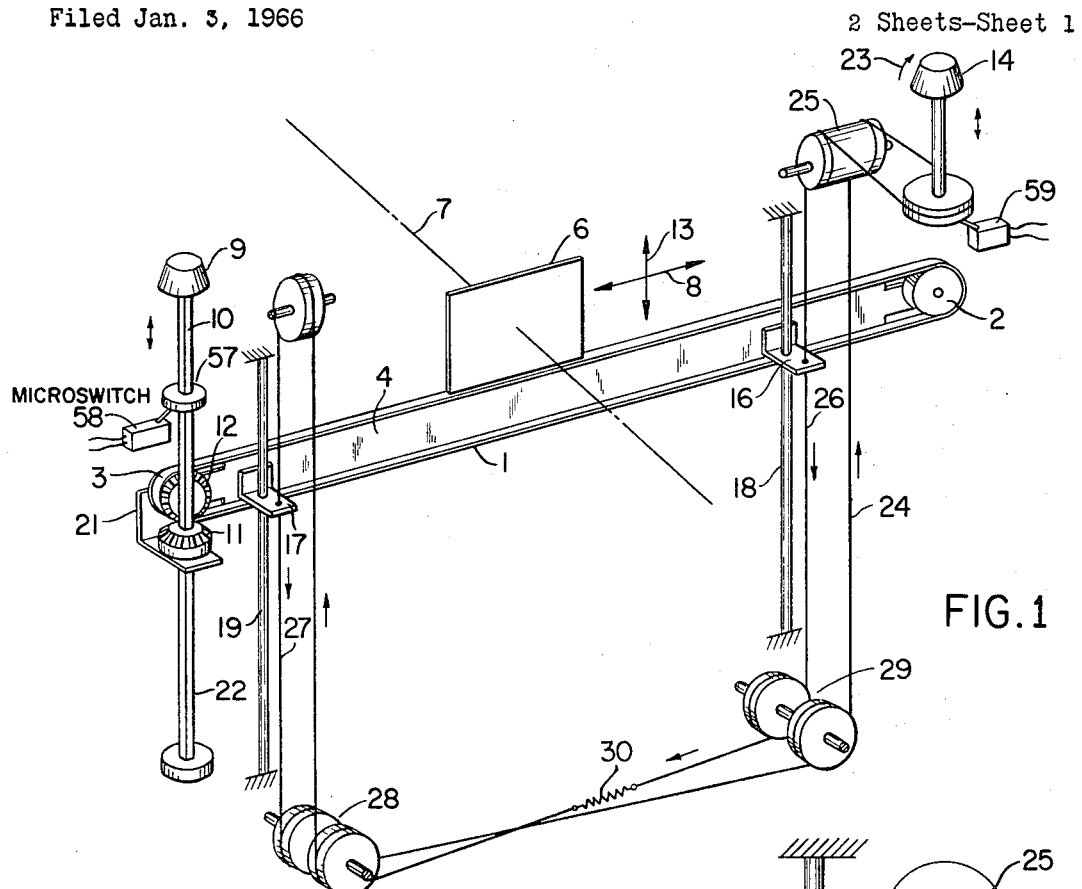

FIGURE 1 discloses a schematic of the chip positioning mechanism.

Figure 2:
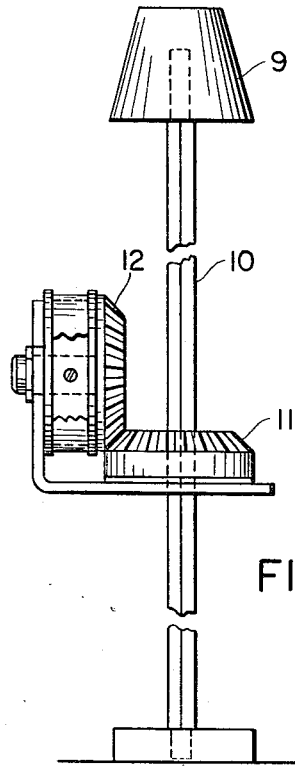

FIGURE 2 discloses an end view of the belt actuation mechanism illustrated in FIGURE 1.

Figure 3:
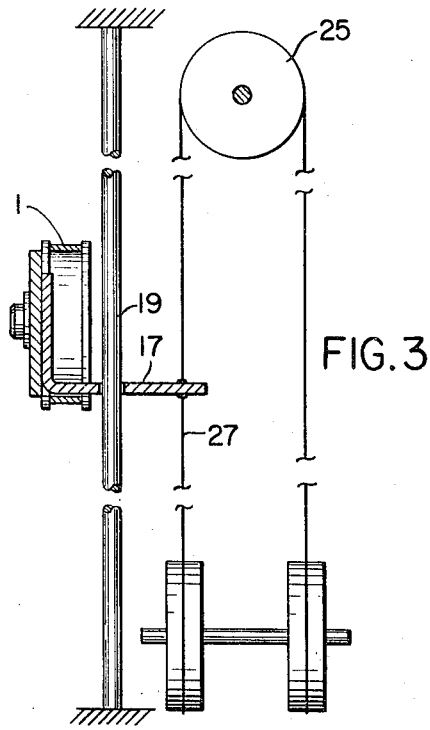

FIGURE 3 discloses an end view of the belt support mechanism of FIGURE 1.

Figure 4:
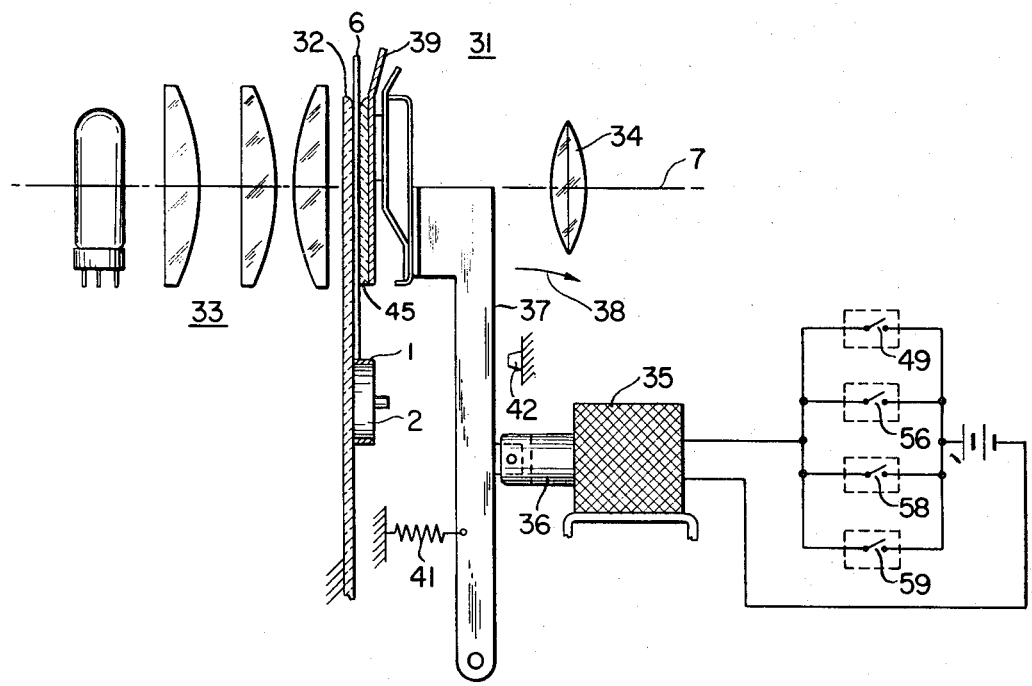

FIGURE 4 discloses the gate control system.

Figure 5:
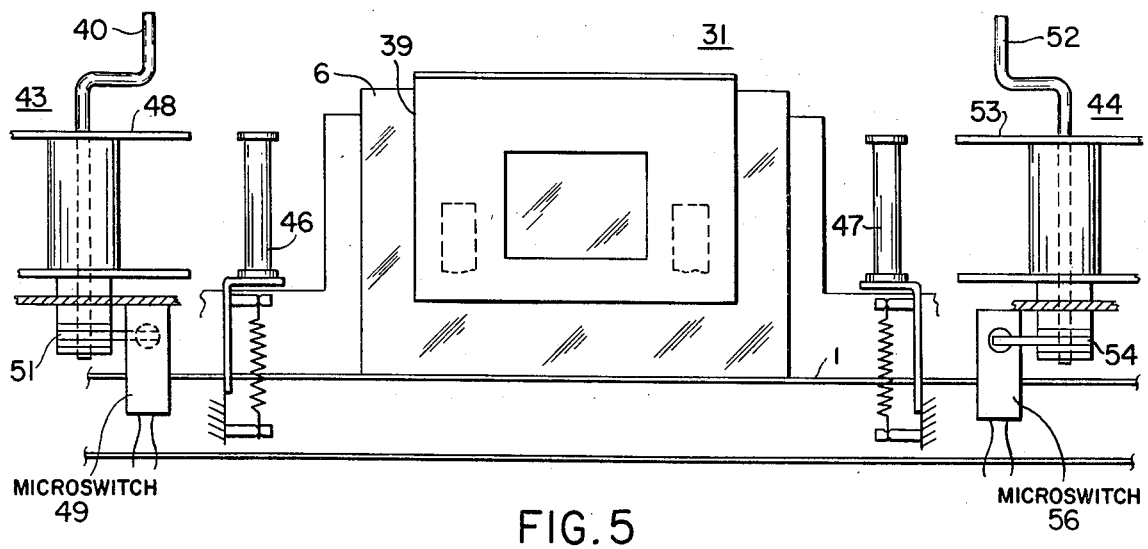

FIGURE 5 discloses a front view of the film gate together with the film reels and a portion of the chip support belt.

In accordance with the present invention a light, movable chip carriage including an elongated belt surrounding an elongated belt reinforcing member is vertically positionable with respect to a film gate to shift the vertical position of the chip with respect to the gate. The chip is shifted horizontally with respect to the gate by driving the belt along its length. Film reels are positioned astride the aforesaid gate and control circuitry is provided for automatically separating the optical flats of the gate upon the actuation of either film reel or upon the horizontal or vertical positioning of the chip to prevent abrasion and mechanical loading of the film or chip.

Referring now to FIGURE 1 which discloses a schematic of the chip positioning mechanism, an elongated rubber belt 1 is shown mounted upon pulleys 2 and 3 which in turn are mounted upon an elongated rigid belt reinforcing member 4, which could be utilized, if desired, to aid in the support of the chip, should the belt become slack. Chip transparency 6 is shown riding upon the upper surface of belt 1. Chip 6 is also supported by the optical flats as indicated in FIGURE 4. The optical axis is indicated by line 7. Chip 6 may be selectively positioned along the horizontal, indicated by arrow 8 by causing the elongated belt 1 to move along its length. This is effected by rotating knob 9 and shaft 10 which in turn causes the rotation of gears 11 and 12. Since gear 12 is affixed to pulley 3, it is apparent that the rotation of knob 9 will effect transportation of chip 6 in the horizontal direction. In order to move chip 6 in the vertical direction indicated by arrow 13, knob 14 is rotated by the viewer to cause bearing members 16 and 17 to ride up and down tracks 18 and 19. Since bearing members 16 and 17 are affixed to belt and pulley support member 4, it should be apparent that vertical positioning of the film chip 6 is effected by the rotation of knob 14. Since pulley 3 is rotatably mounted upon support member 21 and since this member is slidably mounted upon track post 22 by means of the square keyway formed in gear 11, it may be seen that the gear mechanism described hereinbefore will ride up and down post 22 along with the vertical movement of the entire chip carriage. The cable 24 is joined at its ends to spring 30, which maintains tension therein. Dual pulley units 25, 29 and 28 each comprise twin pulleys which are free to rotate in opposite directions. The rotation of knob 14 clockwise in the direction of arrow 23 causes the carriage to be actuated downwardly since cable segments 26 and 27 are pulling members 16 and 17 respectively in a downward direction. In like manner, the rotation of knob 14 counterclockwise causes members 16 and 17 to be pulled upward in the direction of arrow 13 to raise chip 6 with respect to optical axis 7. It should now be obvious that the rotation of knob 9 causes chip 6 to be moved along the horizontal direction, while the actuation of knob 14 causes chip 6 to be vertically displaced in the direction of arrow 13 so that a particular desired block of data printed upon chip 6 may be positioned at optical axis 7 to allow the operator to view this data.

FIGURE 2 discloses a side view of the aforesaid pulley support and gear arrangement which rides up and down vertical post 10.

FIGURE 3 discloses a side view of member 17, post 19 and the manner to which it is connected to cable segment 27.

Referring now to FIGURES 4 and 5, chip 6 is disclosed supported by the upper surface of belt 1. Glass optical flats 32 and 45 are positioned astride chip 6 as clearly shown in FIGURE 4. Conventional condenser lens system 33, together with an objective lens 34, is positioned about optical axis 7 so that after positioning of chip 6 the selected data block will be viewed by means not shown. Solenoid 35, upon being energized, causes plunger 36 to be moved to the right thereby actuating arm 37 in the direction indicated by arrow 38. This causes metallic gate member 39 to effect separation of optical flats 32 and 45. upon the de-energization of solenoid 35, biasing spring 41 causes the gate to close. The movement of arm 37 is limited by stop member 42. Stationary optical flat 32 is affixed to the frame of the machine as indicated by the mechanical ground symbol of FIGURE 4.

FIGURE 5 additionally discloses film winding reels 43 and 44 which are utilized to transport film through the same gate used for chip viewing. Conventional spring biased positioning rollers 46 and 47 are snapped into position. The actuation of handle 40 causes the rotation of reel 48 and the closure of switch 49 by means of a conventional friction clutch 51. In like manner, the actuation of handle 52 causes the rotation of reel 53, which in turn actuates friction clutch 54 to close switch 56. The switches are positioned with respect to the clutches so that the actuation of either handle to operate its actuated reel in the "takeup" mode will cause the closure of the switch associated with that particular reel. Since switches 49 and 46 are arranged in the parallel circuit of FIGURE 4, it should be apparent that the operation of either reel will cause the energization of solenoid 35 to immediately open the gate to prevent abrasion and mechanical loading of the film.

The actuation of knob 9 to effect horizontal shifting of the chip in either direction causes friction clutch 57 to close switch 58, shown in FIGURES 1 and 4, to thereby cause the gate to open upon the horizontal shifting of the chip, also to prevent abrasion of the chip. switches 49 and 56 are arranged in the parallel circuit displacement of the chip in either direction will immediately cause the closure of switch 59, shown in FIGURES 1 and 4, which will cause the gate to open. In the alternative, a slight depression of the knob rather than rotation could effect closure. In summary, the actuation of either reel in the film mode of operation causes the gate to open, while the actuation of either the vertical or horizontal chip positioning knob will cause the gate to open.

While there has been described what is at present considered to be the preferred embodiment of this invention, it will be obvious to those skilled in the art that various changes and modifications may be made therein without departing from the invention and it is, therefore, intended in the appended claims to cover all such changes and modifications as fall within the true spirit and scope of the invention.

What is claimed is:

1. An optical viewer for viewing chip transparencies comprising:
    (a) a frame;
    (b) an optical projection axis;
    (c) support means for maintaining the planar faces of a chip transparency substantially perpendicular to said optical axis and including an elongated movable belt having an upper surface substantially perpendicular to the planar faces of said chip transparency for supporting said chip transparency solely along edge portions thereof; and
    (d) chip positioning means coupled to said frame for selectively moving said elongated movable belt along its length or in a direction transverse to its length to selectively position portions of said transparency at said optical axis.

2. The combination as set forth in claim 1 wherein said movable belt is endless.

3. The combination as set forth in claim 1 wherein said chip positioning means further includes gear means for actuating said elongated movable belt in a first direction along its length, one of the gears of said gear means having a hole therethrough; and a rotatable track post positioned within said hole so that said gear having said hole therethrough may be rotated so cause said belt to move in said first direction and so that said belt may be displaced in a second direction substantially perpendicular to said first direction by virtue of said gear sliding along said track post.

4. The combination as set forth in claim 3 wherein said elongated movable belt is driven by a pulley coupled to said gear means.

5. The combination as set forth in claim 4 further including an elongated re-enforcing member positioned below said elongated belt and carrying said gear means; a movable cable mechanically coupled to said elongated re-enforcing member; and means for moving said cable in a direction transverse to the surface of said belt to provide for positioning of said elongated belt in a direction transverse to its length.

References Cited

UNITED STATES PATENTS

| | | | |
|---|---|---|---|
| 2,501,453 | 3/1950 | Rowe et al. | 353—27 |
| 1,478,384 | 12/1923 | Dorsch | 40—96 |
| 2,781,595 | 2/1957 | Bourdin | 40—96 X |
| 3,190,519 | 6/1965 | Nash | 352—225 X |
| 3,226,173 | 12/1965 | Bettuzzi | 40—65 X |
| 3,229,396 | 1/1966 | Shaw. | |
| 3,240,115 | 3/1966 | Robbins et al. | |
| 3,259,451 | 7/1966 | Fairbank et al. | 322—225 |

EUGENE R. CAPOZIO, Primary Examiner

R. CARTER, Assistant Examiner

U.S. Cl. X.R.

40—106.1; 353—27